United States Patent
Sodeyama et al.

(10) Patent No.: US 12,191,519 B2
(45) Date of Patent: Jan. 7, 2025

(54) SECONDARY BATTERY, METHOD FOR MANUFACTURING SECONDARY BATTERY, ELECTRONIC DEVICE, AND ELECTRIC TOOL

(71) Applicant: MURATA MANUFACTURING CO., LTD., Kyoto (JP)

(72) Inventors: Kunio Sodeyama, Kyoto (JP); Yu Nomura, Kyoto (JP); Kosuke Yanagida, Kyoto (JP); Noriaki Kokubu, Kyoto (JP); Hidehiko Wakui, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 474 days.

(21) Appl. No.: 17/720,628

(22) Filed: Apr. 14, 2022

(65) Prior Publication Data

US 2022/0238955 A1 Jul. 28, 2022

Related U.S. Application Data

(63) Continuation of application No. PCT/JP2020/044024, filed on Nov. 26, 2020.

(30) Foreign Application Priority Data

Dec. 16, 2019 (JP) ................................ 2019-226492

(51) Int. Cl.
*H01M 10/0587* (2010.01)
*H01M 50/169* (2021.01)
*H01M 50/342* (2021.01)

(52) U.S. Cl.
CPC ..... *H01M 50/342* (2021.01); *H01M 10/0587* (2013.01); *H01M 50/169* (2021.01); *H01M 2220/30* (2013.01)

(58) Field of Classification Search
CPC ........... H01M 50/342; H01M 10/0587; H01M 50/169; H01M 2220/30; H01M 50/107; H01M 50/3425; H01M 10/0431; H01M 50/147; H01M 50/572; Y02E 60/10; Y02P 70/50

See application file for complete search history.

(56) References Cited

U.S. PATENT DOCUMENTS

| 2007/0172728 A1* | 7/2007 | Yamashita ........ H01M 50/3425 429/174 |
| 2011/0311847 A1 | 12/2011 | Tanaka et al. |
| 2018/0175333 A1* | 6/2018 | Sodeyama ............ B60L 3/0046 |

FOREIGN PATENT DOCUMENTS

| JP | 2007194167 A | 8/2007 |
| JP | 2009266782 A | 11/2009 |
| JP | 2011192550 A | 9/2011 |
| WO | 2019/112160 | 5/2018 |

OTHER PUBLICATIONS

International Search Report of corresponding PCT application PCT/JP2020/044024, dated Dec. 28, 2020.
Japanese Office Action issued Dec. 27, 2022 in corresponding Japanese Application No. 2021-565421.
European Search Report dated Jun. 13, 2024 in corresponding European Application No. 20902021.3.
Chinese Office Action issued Oct. 31, 2023 in corresponding Chinese Application No. 202080062532.1.

* cited by examiner

*Primary Examiner* — Muhammad S Siddiquee
(74) *Attorney, Agent, or Firm* — K&L Gates LLP

(57) ABSTRACT

A secondary battery including an electrode wound body having a structure in which a band-shaped positive electrode and a band-shaped negative electrode are stacked and wound with a separator interposed therebetween, an electrolyte solution, a battery can that accommodates the electrode wound body and the electrolyte solution, a battery lid that closes an open end portion of the battery can, and a safety valve mechanism provided between the battery lid and the electrode wound body, wherein the safety valve mechanism includes at least a safety cover, an outer peripheral portion of the battery lid and an outer peripheral portion of the safety cover are joined, and an area of a region where the outer peripheral portion of the battery lid and the outer peripheral portion of the safety cover are joined is 18.1% or more and 25.0% or less of a sectional area of the battery in a radial direction.

8 Claims, 6 Drawing Sheets

SECONDARY BATTERY, METHOD FOR MANUFACTURING SECONDARY BATTERY, ELECTRONIC DEVICE, AND ELECTRIC TOOL

CROSS REFERENCE TO RELATED APPLICATIONS

The present application is a continuation of PCT patent application no. PCT/JP2020/044024 filed on Nov. 26, 2020, which claims priority to Japanese patent application no. JP2019-226492 filed on Dec. 16, 2019, the entire contents of which are being incorporated herein by reference.

BACKGROUND

The present application relates to a secondary battery, a method for manufacturing a secondary battery, an electronic device, and electric tool.

Applications of lithium ion batteries have been expanded to electric tools, electric vehicles, and the like. In electronic devices including these large devices, impact is applied from the outside to damage the battery in some cases. Impact resistance of the battery is therefore one of important factors, and various development studies have been conducted.

For example, a resistance value of a battery is reduced by laser welding a battery lid and a safety cover of a safety valve mechanism.

SUMMARY

The present disclosure relates to a secondary battery, a method for manufacturing a secondary battery, an electronic device, and electric tool.

However, because a conventional battery uses a laser welding method for welding the battery lid and the safety cover of the safety valve mechanism, there is a problem that the battery is weak against repeating impact and low in impact resistance.

The present technology, in an embodiment, is directed to providing a battery having a high vibration resistance.

The present technology, in an embodiment, is directed to a secondary battery including an electrode wound body having a structure in which a band-shaped positive electrode and a band-shaped negative electrode are stacked and wound with a separator interposed therebetween, an electrolyte solution, a battery can that accommodates the electrode wound body and the electrolyte solution, a battery lid that closes an open end portion of the battery can, and a safety valve mechanism provided between the battery lid and the electrode wound body, wherein the safety valve mechanism includes at least a safety cover, an outer peripheral portion of the battery lid and an outer peripheral portion of the safety cover are joined, and an area of a region where the outer peripheral portion of the battery lid and the outer peripheral portion of the safety cover are joined is 18.1% or more and 25.0% or less of a sectional area of the battery in a radial direction.

The present technology, in an embodiment, is directed to a method for manufacturing a secondary battery, the secondary battery including an electrode wound body having a structure in which a band-shaped positive electrode and a band-shaped negative electrode are stacked and wound with a separator interposed therebetween, an electrolyte solution, a battery can that accommodates the electrode wound body and the electrolyte solution, a battery lid that closes an open end portion of the battery can, and a safety valve mechanism provided between the battery lid and the electrode wound body, wherein the safety valve mechanism includes at least a safety cover, an outer peripheral portion of the battery lid and an outer peripheral portion of the safety cover are joined by a welding method, and an area of a region where the outer peripheral portion of the battery lid and the outer peripheral portion of the safety cover are joined is 18.1% or more and 25.0% or less of a sectional area of the battery in a radial direction.

The present technology, in an embodiment, can realize a battery in which the portion where the battery lid and the safety cover are joined is resistant to repeating vibrations. Note that contents of the present technology are not to be construed as being limited by the effects exemplified in the present specification.

DETAILED DESCRIPTION

Hereinafter, the present technology will be described with reference to the drawings according to one or more embodiments.

Preferred specific examples of the present are described below according to an embodiment, and the content of the present technology is not limited thereby.

In the embodiment of the present technology, as a secondary battery, a lithium ion battery having a cylindrical shape will be described as an example.

Figure 1:
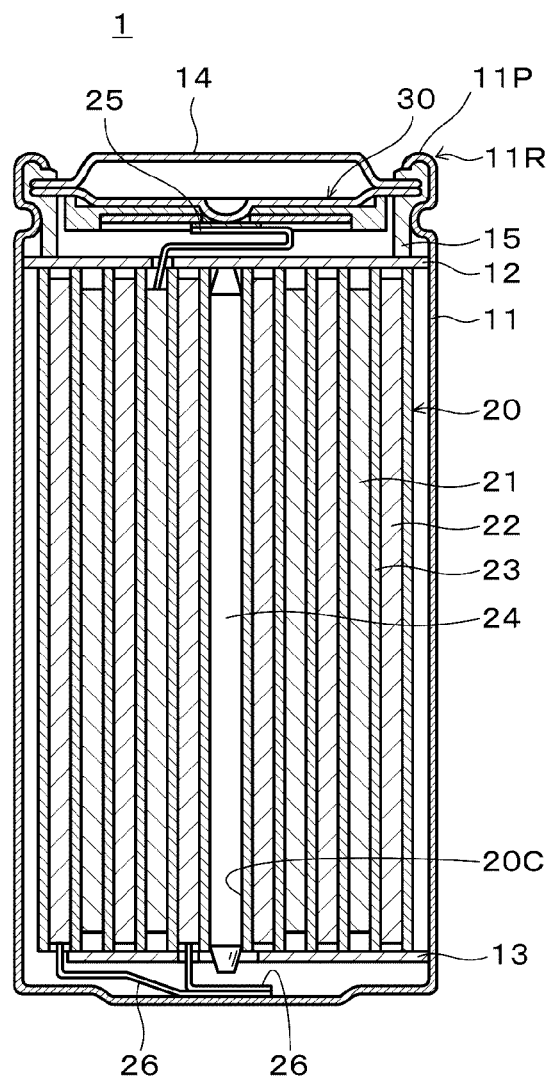
FIG. 1 is a schematic view of a battery according to one embodiment.

First, the overall configuration of the lithium ion battery will be described according to an embodiment. FIG. 1 is a schematic sectional view of a lithium ion battery 1. The lithium ion battery 1 is a cylindrical lithium ion battery 1 in which an electrode wound body 20 is accommodated inside a battery can 11 as shown in FIG. 1.

Specifically, the lithium ion battery 1 includes a pair of insulators 12 and 13 and an electrode wound body 20 inside the battery can 11 having a cylindrical shape. The lithium ion battery 1 may further include, for example, one kind, or two or more kinds of a positive temperature coefficient (PTC) element, a reinforcing member, and the like inside the battery can 11.

The battery can 11 is a member that mainly accommodates the electrode wound body 20. The battery can 11 is, for example, a cylindrical container in which one end portion is open and the other end portion is closed. That is, the battery can 11 has an open end portion. The battery can 11 contains, for example, one kind, or two or more kinds of metal materials such as iron, aluminum, and alloys thereof. Note that, for example one kind, or two or more kinds of metal materials such as nickel may be plated on the surface of the battery can 11.

The insulators 12 and 13 are sheet-like members each having a face substantially perpendicular to a winding axis direction (vertical direction of FIG. 1) of the electrode wound body 20. The insulators 12 and 13 are arranged in such a manner as to sandwich the electrode wound body 20 therebetween. As a material of the insulators 12 and 13, polyethylene terephthalate (PET), polypropylene (PP), bakelite, or the like is used. Examples of bakelite include paper bakelite and cloth bakelite produced by applying a phenolic resin to paper or cloth and then heating the paper or cloth.

A crimp structure 11R is formed at the open end portion of the battery can 11, in which a battery lid 14 and a safety valve mechanism 30 are crimped with a gasket 15. This allows the battery can 11 to be sealed in a state where the electrode wound body 20 and the like are accommodated inside the battery can 11.

The battery lid 14 is a member that closes the open end portion of the battery can 11 in a state where the electrode wound body 20 and the like are accommodated inside the battery can 11, and is formed from iron plated with nickel. The battery lid 14 contains, for example, the same material as the material for forming the battery can 11. A central region of the battery lid 14 protrudes in the vertical direction of FIG. 1.

The gasket 15 is a member that mainly seals a gap between a bent portion 11P (also referred to as crimp portion) of the battery can 11 and the battery lid 14 by being interposed between the bent portion 11P and the battery lid 14. For example, asphalt or the like may be applied to the surface of the gasket 15.

The gasket 15 contains an insulating material. The kind of the insulating material is not particularly limited and is a polymer material such as polybutylene terephthalate (PBT) or polypropylene (PP). This is because the gap between the bent portion 11P and the battery lid 14 is sufficiently sealed while the battery can 11 and the battery lid 14 are electrically separated from each other.

The safety valve mechanism 30 mainly releases the internal pressure of the battery can 11 by releasing the sealed state of the battery can 11 as necessary when the pressure inside the battery can 11 (internal pressure) increases. The cause of the increase in the internal pressure of the battery can 11 is, a gas generated due to a decomposition reaction of an electrolyte solution during charging and discharging.

Figure 2:
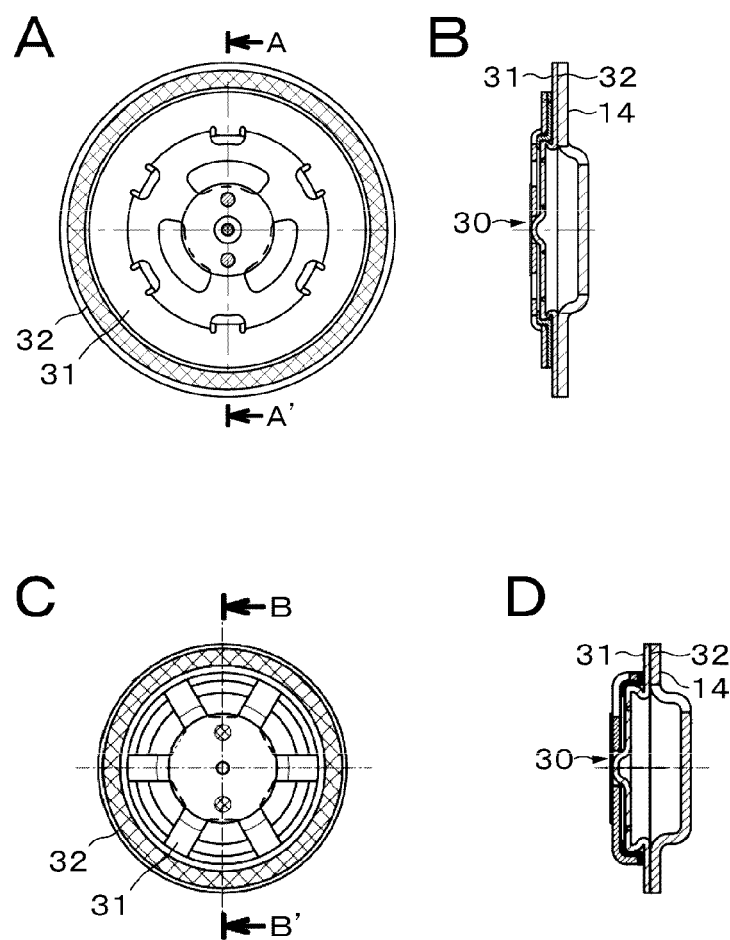
FIG. 2A is a view of a relatively large battery in which a safety cover and a battery lid are integrated as viewed from the safety cover side.
FIG. 2B is a sectional view taken along the line AA' in FIG. 2A.
FIG. 2C is a view of a relatively small battery in which a safety cover and a battery lid are integrated as viewed from the safety cover side.
FIG. 2D is a sectional view taken along the line BB' in FIG. 2C.

In the safety valve mechanism 30, a safety cover 31 is a substantially circular plate-like member and is also called a valve body. The safety cover 31 is made of, for example, aluminum. The central portion of the safety cover 31 may have a protrusion protruding toward the electrode wound body 20 as shown in FIGS. 1 and 2. The outer peripheral portion of the safety cover 31 is joined to the outer peripheral portion of the battery lid 14 by welding as shown in FIGS. 2A to 2D. The welding method is, for example, an ultrasonic welding method. A part of a region 32 where the safety cover 31 and the battery lid 14 are joined is covered with the gasket 15 (FIG. 1) and fixed by the battery can 11. The safety cover 31 and the battery lid 14 have structures as shown in FIGS. 2A and 2B when the outer diameter of the battery is relatively large (for example, when the outer diameter is about 18 mm or about 20 mm), and have structures as shown in FIGS. 2C and 2D when the outer diameter of the battery is relatively small (for example, when the outer diameter is about 14 mm). The region 32 joined by welding is a hatched region in FIGS. 2A and 2C.

The area of the region 32 where the outer peripheral portion of the battery lid 14 and the outer peripheral portion of the safety cover 31 are joined by welding is preferably equal to or more than a threshold value in order to be resistant to an impact from the outside of the battery 1, and is preferably equal to or less than a certain value in order to easily release the internal gas when the pressure rises due to generation of the gas inside the battery 1. As exemplified in the following Examples, the area of the region 32 where the outer peripheral portion of the battery lid 14 and the outer peripheral portion of the safety cover 31 are joined by welding is preferably, for example, 18.5% or more and 25.0% or less of a sectional area of the battery in the radial direction.

In the cylindrical lithium ion battery, a band-shaped positive electrode 21 and a band-shaped negative electrode 22 are spirally wound with a separator 23 interposed therebetween, and are accommodated in the battery can 11 in a state of being impregnated with an electrolyte solution. The positive electrode 21 is obtained by forming a positive electrode active material layer on one face or both faces of a positive electrode current collector, and the negative electrode 22 is obtained by forming a negative electrode active material layer on one side or both sides of a negative electrode current collector, which is not shown. The material of the positive electrode current collector is a metal foil containing aluminum or an aluminum alloy. The material of the negative electrode current collector is a metal foil containing nickel, a nickel alloy, copper, or a copper alloy. The separator 23 is a porous insulating film, which enables movement of lithium ions while electrically insulating the positive electrode 21 and the negative electrode 22.

At the center of the electrode wound body 20, a space (central space 20C) generated when the positive electrode 21, the negative electrode 22, and the separator 23 are wound is provided, and a center pin 24 is inserted into the central space 20C (FIG. 1). The center pin 24 can be omitted.

A positive electrode lead 25 is connected to the positive electrode 21, and a negative electrode lead 26 is connected to the negative electrode 22 (FIG. 1). The positive electrode lead 25 contains a conductive material such as aluminum. The positive electrode lead 25 is electrically connected to the battery lid 14 via a safety valve mechanism 30. The negative electrode lead 26 contains a conductive material such as nickel. The negative electrode lead 26 is electrically connected to the battery can 11. Detailed configurations and materials of the positive electrode 21, the negative electrode 22, the separator 23, and the electrolyte solution will be described later.

The positive electrode active material layer contains at least a positive electrode material (positive electrode active material) capable of occluding and releasing lithium, and may further contain a positive electrode binder, a positive electrode conductive agent, and the like. The positive electrode material is preferably a lithium-containing composite oxide or a lithium-containing phosphate compound. The lithium-containing composite oxide has, for example, a layered rock salt-type or spinel-type crystal structure. The lithium-containing phosphate compound has, for example, an olivine type crystal structure.

The positive electrode binder contains a synthetic rubber or a polymer compound. Examples of the synthetic rubber include styrene-butadiene-based rubber, fluorine-based rubber, and ethylene propylene diene. Examples of the polymer compound include polyvinylidene fluoride (PVdF) and polyimide.

The positive electrode conductive agent is a carbon material such as graphite, carbon black, acetylene black, or Ketjen black. The positive electrode conductive agent may be a metal material or a conductive polymer.

The surface of the negative electrode current collector is preferably roughened for improving close contact with the negative electrode active material layer. The negative electrode active material layer contains at least a negative electrode material (negative electrode active material) capable of occluding and releasing lithium, and may further contain a negative electrode binder, a negative electrode conductive agent, and the like.

The negative electrode material includes, for example, a carbon material. The carbon material is graphitizable carbon, non-graphitizable carbon, graphite, low crystalline carbon, or amorphous carbon. The shape of the carbon material is a fibrous, spherical, granular, or scaly shape.

The negative electrode material contains, for example, a metal-based material. Examples of the metal-based material include Li (lithium), Si (silicon), Sn (tin), Al (aluminum), Zr (zinc), and Ti (titanium). The metal-based element forms a compound, a mixture, or an alloy with another element, and examples thereof include silicon oxide ($SiO_x$ ($0<x\leq2$)), silicon carbide (SiC), an alloy of carbon and silicon, and lithium titanium oxide (LTO).

In the lithium ion battery 1, when the open circuit voltage (that is, the battery voltage) at the time of full charge is 4.25 V or more, the release amount of lithium per unit mass increases as compared with the case where the open circuit voltage at the time of full charge is low with the same positive electrode active material. As a result, a high energy density can be obtained.

The separator 23 is a porous film containing a resin, and may be a layered film of two or more kinds of porous films. Examples of the resin include polypropylene and polyethylene. The separator 23 may include a resin layer on one side or both sides of a porous film as a substrate layer. This is because close contact of the separator 23 to each of the positive electrode 21 and the negative electrode 22 improves, which suppresses the distortion of the electrode wound body 20.

The resin layer contains a resin such as PVdF. In the case of forming the resin layer, a solution in which a resin is dissolved in an organic solvent is applied to the substrate layer, and then the substrate layer is dried. The substrate layer may be immersed in the solution and thereafter dried. The resin layer preferably contains inorganic particles or organic particles from the viewpoint of improving the heat resistance and the safety of the battery. The kind of the inorganic particles is aluminum oxide, aluminum nitride, aluminum hydroxide, magnesium hydroxide, boehmite, talc, silica, mica, or the like. In place of the resin layer, a surface layer formed by a sputtering method, an atomic layer deposition (ALD) method, or the like and containing inorganic particles as a main component may be used.

The electrolyte solution contains a solvent and an electrolyte salt, and may further contain an additive or the like as necessary. The solvent is a nonaqueous solvent such as an organic solvent, or water. An electrolyte solution containing a nonaqueous solvent is referred to as a nonaqueous electrolyte solution. Examples of the nonaqueous solvent include a cyclic carbonate ester, a chain carbonate ester, a lactone, a chain carboxylate ester, and a nitrile (mononitrile).

Lithium salts are typical examples of the electrolyte salt, but a salt other than lithium salts may be contained. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$). These salts can also be used in mixture, and among them, it is preferable to use $LiPF_6$ and $LiBF_4$ in mixture from the viewpoint of improving battery characteristics. The content of the electrolyte salt is not particularly limited, and is preferably 0.3 mol/kg to 3 mol/kg with respect to the solvent.

Next, a method for manufacturing a secondary battery will be described according to an embodiment. First, in the case of producing the positive electrode 21, a positive electrode active material, a positive electrode binder, and a positive electrode conductive agent are mixed to produce a positive electrode mixture. Subsequently, the positive electrode mixture is dispersed in an organic solvent to produce a positive electrode mixture slurry in a paste form. Then, the positive electrode mixture slurry is applied to both surfaces of a positive electrode current collector and thereafter dried to form a positive electrode active material layer. Subsequently, the positive electrode active material layer is compression-molded while being heated using a roll press machine to obtain the positive electrode 21.

The negative electrode 22 is produced in the same procedure as the positive electrode 21 described above.

Next, the positive electrode lead 25 is connected to the positive electrode current collector and the negative electrode lead 26 is connected to the negative electrode current collector using a welding method. Subsequently, the positive electrode 21 and the negative electrode 22 are stacked with the separator 23 interposed therebetween, and they are wound to form the electrode wound body 20. Subsequently, the center pin 24 is inserted into the central space 20C of the electrode wound body 20.

Subsequently, the electrode wound body 20 is accommodated inside the battery can 11 while the electrode wound body 20 is sandwiched between a pair of insulators. Next, one end of the positive electrode lead 25 is connected to the safety valve mechanism 30 and one end of the negative electrode lead 26 is connected to the battery can 11 using a welding method.

Subsequently, the battery can 11 is processed using a beading machine (grooving machine) to form a recess in the battery can 11. Then, an electrolyte solution is injected into the battery can 11 to impregnate the electrode wound body 20 with the electrolyte solution. Subsequently, the outer peripheral portion of the battery lid 14 and the outer peripheral portion of the safety cover 31 of the safety valve mechanism 30 are joined by welding, and the battery lid 14 and the safety valve mechanism 30 are accommodated inside the battery can 11 together with the gasket 15.

Next, as shown in FIG. 1, at the open end portion of the battery can 11, the outer peripheral portion of the battery lid 14 and the outer peripheral portion of the safety cover 31 are welded, and then the battery lid 14 and the safety valve mechanism 30 are crimped with the gasket 15 to form the crimp structure 11R. Finally, the battery can 11 is closed with the battery lid 14 using a press machine, whereby the secondary battery is completed.

EXAMPLES

Hereinafter, the present technology will be specifically described based on Examples in which batteries having different welding areas, welding methods, and the like in the region 32 where the battery lid 14 and the safety cover 31 are joined are tested using the secondary battery produced as described above according to an embodiment. The present technology is not limited to Examples described below.

The outer peripheral portion of the battery lid 14 and the outer peripheral portion of the safety cover 31 were welded in a ring shape as shown in the hatched region in FIG. 2A or 2C. The area of the region 32 joined by welding (the area of the region where the outer peripheral portion of the battery lid 14 and the outer peripheral portion of the safety cover 31 are joined by welding) was determined from the inner diameter and the outer diameter of the region 32 joined by welding, and the sectional area of the battery in the radial direction was determined from the outer diameter of the battery (when the outer diameter of the battery was r, the sectional area of the battery in the radial direction was $\pi r^2/4$). Then, a value obtained by dividing the area of the region 32 joined by welding by the sectional area of the battery in the radial direction was defined as a welding rate. In Examples 1 to 6 and Comparative Examples 1 to 7, an ultrasonic welding method was used for welding the outer peripheral portion of the battery lid 14 and the outer peripheral portion of the safety cover 31.

Example 1

The welding rate was set to 25.0% by setting the outer diameter of the battery 1 to 13.8 mm, setting the inner diameter of the region 32 joined by welding to 9.52 mm, and setting the outer diameter of the region 32 joined by welding to 11.76 mm.

Example 2

The welding rate was set to 19.2% by setting the outer diameter of the battery 1 to 13.8 mm, setting the inner diameter of the region 32 joined by welding to 10.09 mm, and setting the outer diameter of the region 32 joined by welding to 11.76 mm.

Example 3

The welding rate was set to 18.5% by setting the outer diameter of the battery 1 to 13.8 mm, setting the inner diameter of the region 32 joined by welding to 10.15 mm, and setting the outer diameter of the region 32 joined by welding to 11.76 mm.

Example 4

The welding rate was set to 18.1% by setting the outer diameter of the battery 1 to 13.8 mm, setting the inner diameter of the region 32 joined by welding to 10.19 mm, and setting the outer diameter of the region 32 joined by welding to 11.76 mm.

Example 5

The welding rate was set to 25.0% by setting the outer diameter of the battery 1 to 18.20 mm, setting the inner diameter of the region 32 joined by welding to 12.79 mm, and setting the outer diameter of the region 32 joined by welding to 15.7 mm.

Example 6

The welding rate was set to 23.8% by setting the outer diameter of the battery 1 to 18.05 mm, setting the inner diameter of the region 32 joined by welding to 13.00 mm, and setting the outer diameter of the region 32 joined by welding to 15.7 mm.

Example 7

The welding rate was set to 18.6% by setting the outer diameter of the battery 1 to 18.20 mm, setting the inner diameter of the region 32 joined by welding to 13.60 mm, and setting the outer diameter of the region 32 joined by welding to 15.7 mm.

Example 8

The welding rate was set to 18.1% by setting the outer diameter of the battery 1 to 18.05 mm, setting the inner diameter of the region 32 joined by welding to 13.69 mm, and setting the outer diameter of the region 32 joined by welding to 15.7 mm.

Example 9

The welding rate was set to 25.0% by setting the outer diameter of the battery 1 to 21.20 mm, setting the inner diameter of the region 32 joined by welding to 15.10 mm, and setting the outer diameter of the region 32 joined by welding to 18.45 mm.

Example 10

The welding rate was set to 24.3% by setting the outer diameter of the battery 1 to 21.20 mm, setting the inner diameter of the region 32 joined by welding to 15.20 mm, and setting the outer diameter of the region 32 joined by welding to 18.45 mm.

Example 11

The welding rate was set to 18.1% by setting the outer diameter of the battery 1 to 21.20 mm, setting the inner diameter of the region 32 joined by welding to 16.10 mm, and setting the outer diameter of the region 32 joined by welding to 18.45 mm.

Comparative Example 1

The welding rate was set to 25.2% by setting the outer diameter of the battery 1 to 13.8 mm, setting the inner diameter of the region 32 joined by welding to 9.50 mm, and setting the outer diameter of the region 32 joined by welding to 11.76 mm.

Comparative Example 2

The welding rate was set to 18.0% by setting the outer diameter of the battery 1 to 13.8 mm, setting the inner diameter of the region 32 joined by welding to 10.20 mm, and setting the outer diameter of the region 32 joined by welding to 11.76 mm.

Comparative Example 3

The welding rate was set to 25.4% by setting the outer diameter of the battery 1 to 18.05 mm, setting the inner diameter of the region 32 joined by welding to 12.80 mm, and setting the outer diameter of the region 32 joined by welding to 15.7 mm.

Comparative Example 4

The welding rate was set to 18.0% by setting the outer diameter of the battery 1 to 18.05 mm, setting the inner diameter of the region 32 joined by welding to 13.70 mm, and setting the outer diameter of the region 32 joined by welding to 15.7 mm.

Comparative Example 5

The welding rate was set to 17.8% by setting the outer diameter of the battery 1 to 18.20 mm, setting the inner diameter of the region 32 joined by welding to 13.70 mm, and setting the outer diameter of the region 32 joined by welding to 15.7 mm.

Comparative Example 6

The welding rate was set to 27.0% by setting the outer diameter of the battery 1 to 21.20 mm, setting the inner diameter of the region 32 joined by welding to 14.80 mm, and setting the outer diameter of the region 32 joined by welding to 18.45 mm.

Comparative Example 7

The welding rate was set to 15.5% by setting the outer diameter of the battery 1 to 21.20 mm, setting the inner diameter of the region 32 joined by welding to 16.45 mm, and setting the outer diameter of the region 32 joined by welding to 18.45 mm.

A vibration test and a combustion test were performed on the above Examples and Comparative Examples after storage at a high temperature and a high humidity. The number of tests is 10 for each test of each example. The vibration test is based on the UN 38.3 standard. A battery having a small change in the internal resistance value (resistance value ACR (mΩ) at an alternating current of 1 kHz) before and after the vibration test (when the rate of increase in the resistance value was 10% or less) was evaluated as OK, and a battery having a large change in the internal resistance value (when the rate of increase in the resistance value was more than 10%) was evaluated as NG. The combustion test is based on the UL 1642 projectile test. The case where the success rate in the combustion test was 90% or more was evaluated as OK, and the case where the success rate in the combustion test was less than 90% was evaluated as NG. In the high temperature and high humidity storage performed before the vibration test and the combustion test, the battery 1 was stored in an environment of a temperature of 60° C. and a humidity of 90% for about 1 month.

TABLE 1

| | Outer diameter of battery (mm) | Sectional area of battery in radial direction (mm$^2$) | Inner diameter of welded portion (mm) | Outer diameter of welded portion (mm) | Area of welded portion (mm$^2$) | Welding rate (%) | Vibration test | Combustion test |
|---|---|---|---|---|---|---|---|---|
| Example 1 | 13.8 | 149.50 | 9.52 | 11.76 | 37.42 | 25.0 | OK | OK |
| Example 2 | 13.8 | 149.50 | 10.09 | 11.76 | 28.64 | 19.2 | OK | OK |
| Example 3 | 13.8 | 149.50 | 10.15 | 11.76 | 27.69 | 18.5 | OK | OK |
| Example 4 | 13.8 | 149.50 | 10.19 | 11.76 | 27.05 | 18.1 | OK | OK |
| Example 5 | 18.20 | 260.02 | 12.79 | 15.7 | 65.08 | 25.0 | OK | OK |
| Example 6 | 18.05 | 255.75 | 13.00 | 15.7 | 60.83 | 23.8 | OK | OK |
| Example 7 | 18.20 | 260.02 | 13.60 | 15.7 | 48.30 | 18.6 | OK | OK |
| Example 8 | 18.05 | 255.75 | 13.69 | 15.7 | 46.37 | 18.1 | OK | OK |
| Example 9 | 21.20 | 352.81 | 15.10 | 18.45 | 88.23 | 25.0 | OK | OK |
| Example 10 | 21.20 | 352.81 | 15.20 | 18.45 | 85.85 | 24.3 | OK | OK |
| Example 11 | 21.20 | 352.81 | 16.10 | 18.45 | 63.74 | 18.1 | OK | OK |
| Comparative Example 1 | 13.8 | 149.50 | 9.50 | 11.76 | 37.72 | 25.2 | OK | NG |
| Comparative Example 2 | 13.8 | 149.50 | 10.20 | 11.76 | 26.89 | 18.0 | NG | OK |
| Comparative Example 3 | 18.05 | 255.75 | 12.80 | 15.7 | 64.88 | 25.4 | OK | NG |
| Comparative Example 4 | 18.05 | 255.75 | 13.70 | 15.7 | 46.16 | 18.0 | NG | OK |
| Comparative Example 5 | 18.20 | 260.02 | 13.70 | 15.7 | 46.16 | 17.8 | NG | OK |
| Comparative Example 6 | 21.20 | 352.81 | 14.80 | 18.45 | 95.27 | 27.0 | OK | NG |
| Comparative Example 7 | 21.20 | 352.81 | 16.45 | 18.45 | 54.79 | 15.5 | NG | OK |

When the welding rate was 18.1% (Examples 4, 8, and 11) or more and 24.3% (Examples 1, 5, and 9) or less as a whole, the battery passed the vibration test and the combustion test, and therefore it can be determined that the battery has high impact resistance and heat resistance. For a battery having an outer diameter of about 14 mm, when the welding rate was 18.1% (Example 4) or more and 25.0% (Example 1) or less, the battery passed the vibration test and the combustion test, and therefore it can be determined that the battery has high impact resistance and heat resistance.

Next, for the battery having the shape of Example 3, a difference in welding between the outer peripheral portion of the battery lid 14 and the outer peripheral portion of the safety cover 31 due to the welding method was examined.

Example 21

Figure 3:
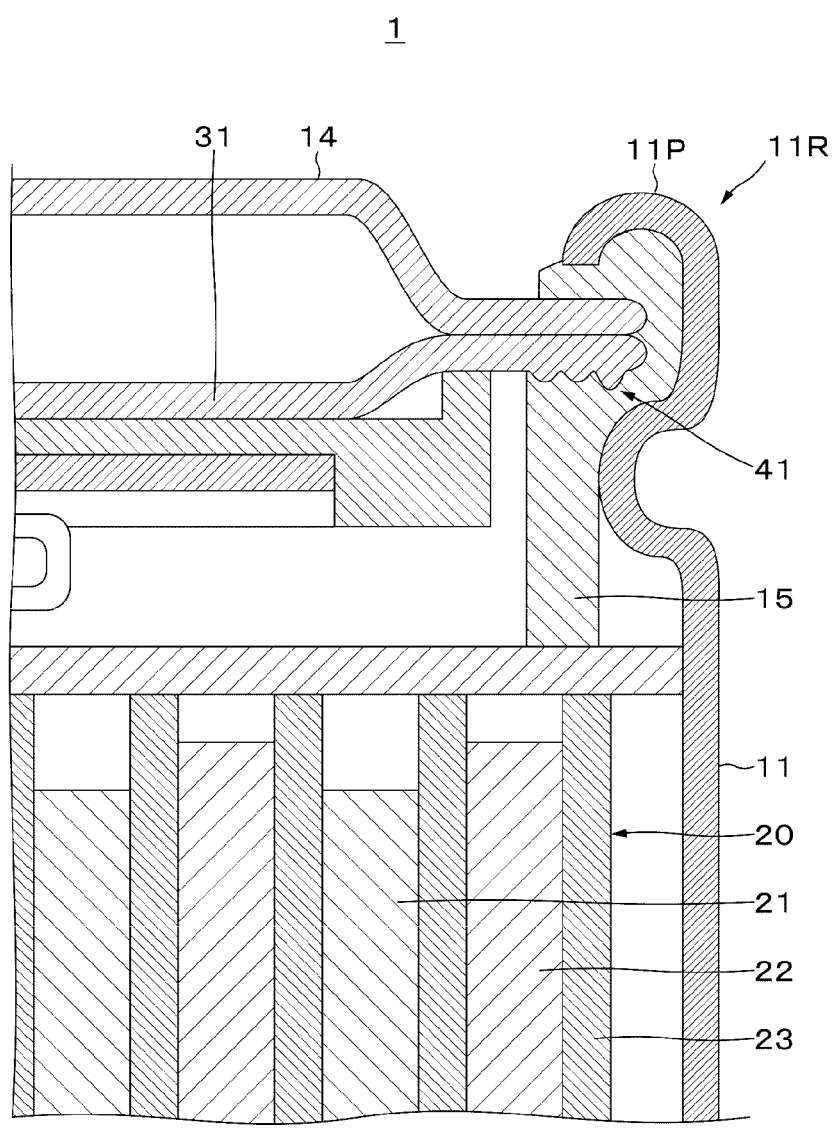
FIG. 3 is a view showing a part of a battery in which a safety cover with a protrusion is arranged.

The welding rate was set to 18.5% by setting the outer diameter of the battery 1 to 13.8 mm, setting the inner diameter of the region 32 joined by welding to 10.15 mm, and setting the outer diameter of the region 32 joined by welding to 11.76 mm. An ultrasonic welding method was used for welding the outer peripheral portion of the battery lid 14 and the outer peripheral portion of the safety cover 31. As shown in FIG. 3, in the outer peripheral portion of the safety cover 31, a protrusion 41 was formed on the face opposite to the face welded to the battery lid 14. In the outer peripheral portion of the safety cover 31, a large number of protrusions 41 were arranged on the whole of the face opposite to the face welded to the battery lid 14. Each protrusion 41 had a substantially quadrangular pyramid shape with one side of the bottom portion of 50 to 200 µm and a height of 50 to 200 µm.

Comparative Example 21

The same procedure as in Example 21 was performed except that a laser seam welding method was used for welding the outer peripheral portion of the battery lid 14 and the outer peripheral portion of the safety cover 31, and no protrusion 41 was formed on the face of the outer peripheral portion of the safety cover 31 opposite to the face welded to the battery lid 14.

Comparative Example 22

The same procedure as in Example 21 was performed except that the outer peripheral portion of the battery lid 14 and the outer peripheral portion of the safety cover 31 were not welded and no protrusion 41 was formed on the face of the outer peripheral portion of the safety cover 31 opposite to the face welded to the battery lid 14.

In Example 21 and Comparative Examples 21 and 22, a vibration test was performed after storage at a high temperature and a high humidity under the same conditions as in Examples 1 to 11. The results of the evaluation with the same criteria are shown in Table 2. The number of tests is five for each example.

TABLE 2

| | Welding method | Protrusion | Vibration test |
|---|---|---|---|
| Example 21 | Ultrasonic welding method | Present | OK |
| Comparative Example 21 | Laser seam welding method | Absent | NG |
| Comparative Example 22 | None | Absent | NG |

The battery (Example 21) in which the outer peripheral portion of the battery lid 14 and the outer peripheral portion of the safety cover 31 were welded by an ultrasonic welding method passed the vibration test, and therefore it can be determined that the battery has high impact resistance.

Next, for the battery having the shape of Example 3, a difference of the presence/absence of the protrusion 41 of the safety cover 31 was examined.

Example 31

Example 31 is a same example as Example 21.

Comparative Example 31

The same procedure as in Example 31 was performed except that no protrusion 41 was formed on the face of the outer peripheral portion of the safety cover 31 opposite to the face welded to the battery lid 14.

In Example 31 and Comparative Example 31, a vibration test was performed after storage at a high temperature and a high humidity under the same conditions as in Examples 1 to 11. The results of the evaluation with the same criteria are shown in Table 3. The number of tests is five for each example.

TABLE 3

| | Welding method | Protrusion | Vibration test |
|---|---|---|---|
| Example 31 | Ultrasonic welding method | Present | OK |
| Comparative Example 31 | Ultrasonic welding method | Absent | NG |

The battery (Example 31) having the protrusions 41 on the face of the outer peripheral portion of the safety cover 31 opposite to the face welded to the battery lid 14 passed the vibration test, and therefore it can be said that the battery has high impact resistance.

Although an embodiment of the present technology has been specifically described above, the content of the present technology is not limited to the above-described embodiment, and various modifications based on the technical idea of the present technology can be made.

The outer diameter of the battery is about 14 mm to about 21 mm, but the battery may have a size of outer diameter other than those exemplified. The protrusion 41 may have a shape other than a substantially quadrangular pyramid. The present technology is applicable not only to cylindrical secondary batteries but also to batteries having other shapes as long as the batteries have a battery lid and a safety valve mechanism (safety cover). In this case, the battery may be either a primary battery or a secondary battery. For example, the present technology is applicable to a small button-shaped secondary battery.

Figure 4:
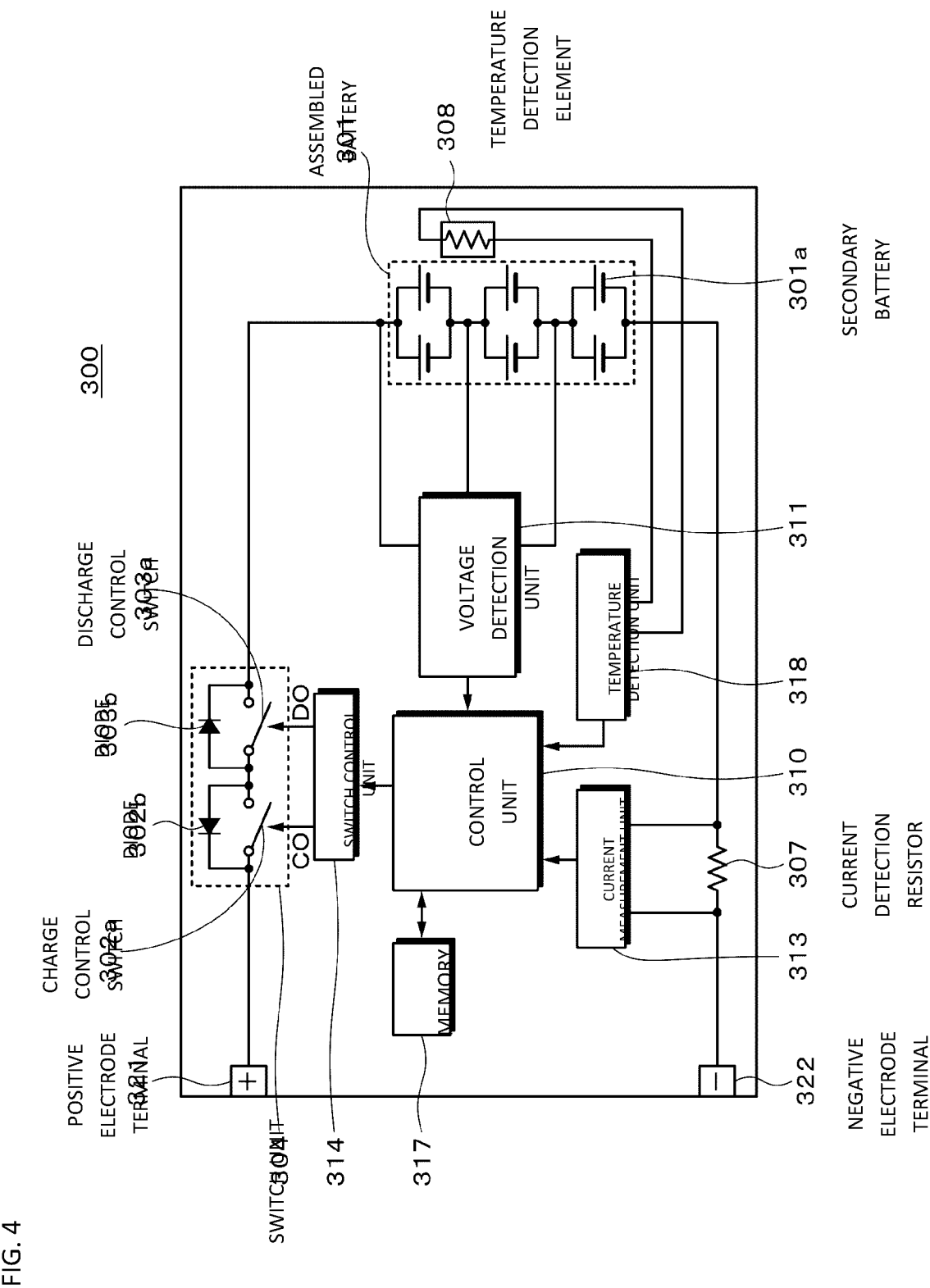
FIG. 4 is a connection diagram used for describing a battery pack as an application example of the present technology.

FIG. 4 is a block diagram showing a circuit configuration example where the secondary battery according to one embodiment or Example of the present technology is applied to a battery pack 300 according to an embodiment. The battery pack 300 includes an assembled battery 301, a switch unit 304 including a charge control switch 302a and a discharge control switch 303a, a current detection resistor 307, a temperature detection element 308, and a control unit 310. The control unit 310 controls each device, and can further perform charge and discharge control at the time of abnormal heat generation, and can calculate and correct the remaining capacity of the battery pack 300. A positive electrode terminal 321 and a negative electrode terminal 322 of the battery pack 300 are connected to a charger or an electronic device, and perform charging and discharging are performed.

The assembled battery 301 is formed by connecting a plurality of secondary batteries 301a in series and/or in parallel. FIG. 4 shows, as an example, a case where six secondary batteries 301a are connected in 2 parallel 3 series (2P3S).

A temperature detection unit 318 is connected to the temperature detection element 308 (for example, a thermistor), measures the temperature of the assembled battery 301 or the battery pack 300, and supplies the measured temperature to the control unit 310. A voltage detection unit 311 measures the voltages of the assembled battery 301 and each of the secondary batteries 301a constituting the assembled battery, performs A/D conversion on the measured voltages, and supplies the converted voltages to the control unit 310. A current measurement unit 313 measures current using the current detection resistor 307 and supplies the measured current to the control unit 310.

A switch control unit 314 controls the charge control switch 302a and the discharge control switch 303a of the switch unit 304 on the basis of the voltage and the current input from the voltage detection unit 311 and the current measurement unit 313. When the voltage of any of the secondary batteries 301a becomes equal to or lower than the overcharge detection voltage (for example, 4.20 V±0.05 V) or the overdischarge detection voltage (2.4 V±0.1 V), the switch control unit 314 sends an OFF control signal to the switch unit 304 to prevent overcharging and overdischarging.

After the charge control switch 302a or the discharge control switch 303a is turned off, charging or discharging can be performed only through a diode 302b or a diode 303b. As these charge/discharge switches, a semiconductor switch such as a MOSFET can be used. Although the switch unit 304 is provided on the positive side in FIG. 4, it may be provided on the negative side.

A memory 317 includes a RAM and a ROM, and stores and rewrites the values of the battery characteristics calculated by the control unit 310, the full charge capacity, the remaining capacity, and the like.

The secondary battery according to the embodiment or Example of the present technology described above can be mounted on a device such as an electronic device, an electric transportation device, or a power storage device, and can be used for supplying electric power.

Examples of the electronic device include notebook computers, smartphones, tablet terminals, PDAs (personal digital assistants), mobile phones, wearable terminals, digital still cameras, electronic books, music players, game machines, hearing aids, electric tools, televisions, lighting devices, toys, medical devices, and robots. In addition, electric transportation device, a power storage device, an electric tool, and an electric unmanned aerial vehicle to be described later may also be included in the electronic device in a broad sense.

Examples of the electric transportation device include electric cars (including hybrid cars), electric motorcycles, electric-assisted bicycles, electric buses, electric carts, automated guided vehicles (AGV), railway vehicles, and the like. The examples also include electric passenger aircrafts and electric unmanned aerial vehicles for transportation. The secondary battery according to the present invention is used not only as a power source for driving these, but also as an auxiliary power supply, a power source for energy regeneration, and the like.

Examples of the power storage device include a power storage module for commercial use or household use, and a power storage power source for a building such as a house, a building, or an office, or for a power generation facility.

Figure 5:
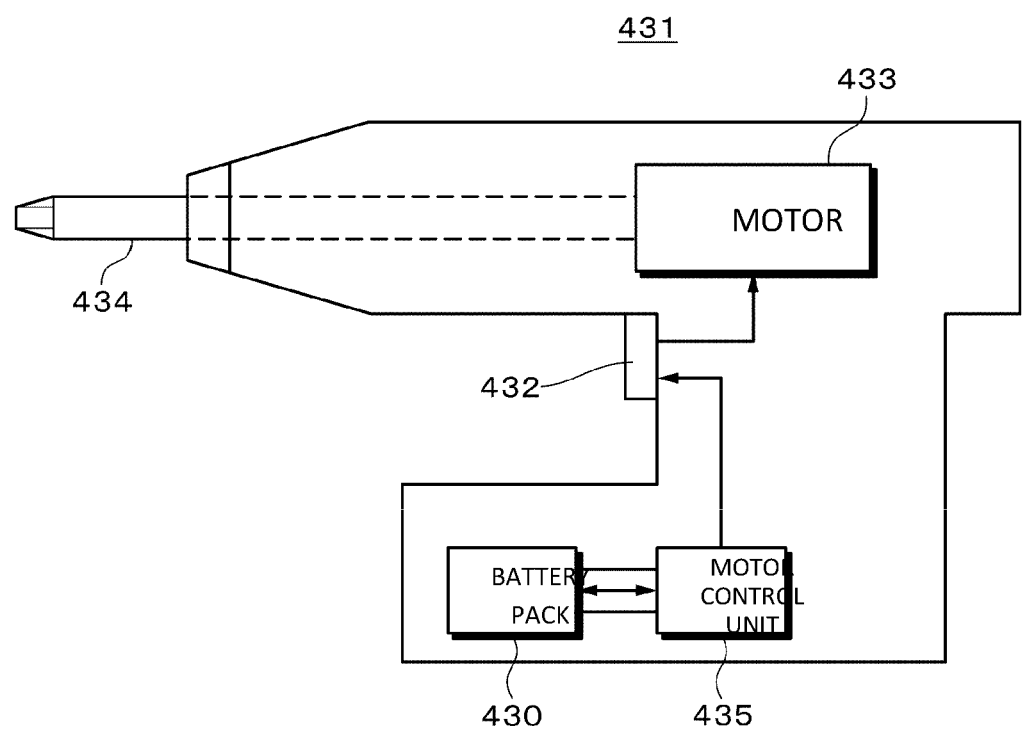
FIG. 5 is a connection diagram used for describing an electric tool as an application example of the present technology.

An example of an electric tool, for example, an electric screwdriver to which the present invention can be applied will be schematically described with reference to FIG. 5. An electric screwdriver 431 is provided with a motor 433 that transmits rotational power to a shaft 434 and a trigger switch 432 to be operated by a user. A battery pack 430 according to the present invention and a motor control unit 435 are accommodated in a lower housing of a handle of the electric screwdriver 431. The battery pack 430 is built in or detachable from the electric screwdriver 431.

Each of the battery pack 430 and the motor control unit 435 may be provided with a microcomputer (not shown) so that charge/discharge information of the battery pack 430 can be communicated between them. The motor control unit 435 controls the operation of the motor 433 and can cut off the power supply to the motor 433 at the time of abnormality such as overdischarging.

Figure 6:
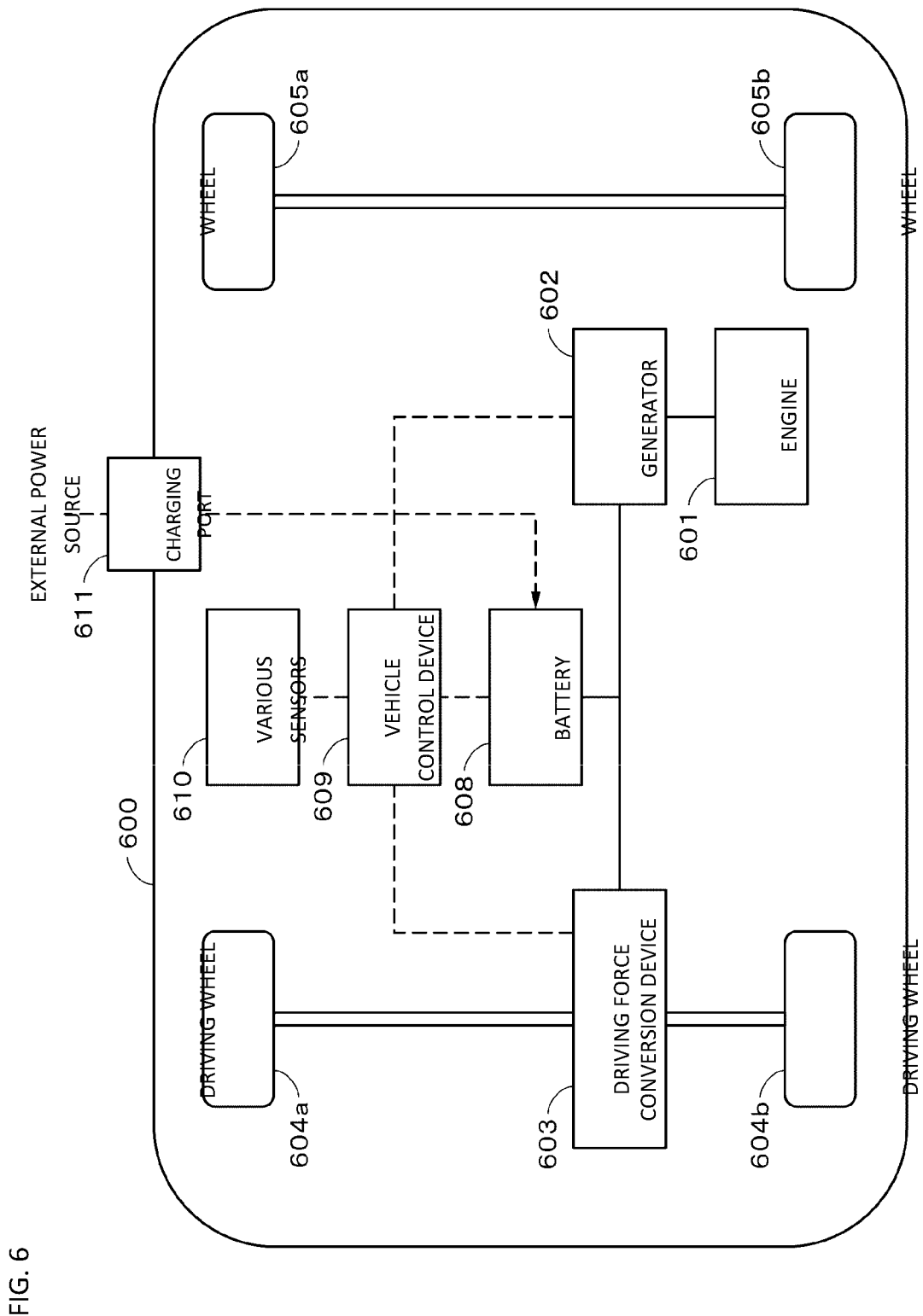
FIG. 6 is a connection diagram used for describing an electric vehicle as an application example of the present technology.

As an example in which the present technology is applied to a power storage system for an electric vehicle, FIG. 6 schematically shows a configuration example of a hybrid vehicle (HV) employing a series hybrid system. The series hybrid system is a vehicle that travels with an electric power-driving force conversion device using electric power generated by a generator driven by an engine or the electric power temporarily stored in a battery.

In a hybrid vehicle 600, an engine 601, a generator 602, and an electric power-driving force conversion device 603 (a DC motor or an AC motor. Hereinafter, it is simply referred to as "motor 603"), a driving wheel 604a, a driving wheel 604b, a wheel 605a, a wheel 605b, a battery 608, a vehicle control device 609, various sensors 610, and a charging port 611 are mounted. As the battery 608, the battery pack 300 of the present invention or a power storage module to which a plurality of secondary batteries of the present invention are mounted can be applied.

The motor 603 is operated by the electric power of the battery 608, and the rotational force of the motor 603 is transmitted to the driving wheels 604a and 604b. The electric power generated by the generator 602 from the rotational force generated by the engine 601 can be stored in the battery 608. The various sensors 610 control the engine speed through the vehicle control device 609 and control the opening degree of a throttle valve (not shown).

When the hybrid vehicle 600 is decelerated by a braking mechanism (not shown), a resistance force at the time of deceleration is applied to the motor 603 as a rotational force, and regenerative electric power generated from the rotational force is stored in the battery 608. The battery 608 can be charged by being connected to an external power supply via the charging port 611 of the hybrid vehicle 600. Such an HV vehicle is referred to as a plug-in hybrid vehicle (PHV or PHEV).

The secondary battery according to the present technology may also be applied to a downsized primary battery and used as a power source of a pneumatic pressure sensor system (TPMS: Tire Pressure Monitoring system) built in the wheels 604 and 605.

In the above, a series hybrid vehicle has been described as an example, but the present technology can also be applied to a parallel system in which an engine and a motor are used in combination, or a hybrid vehicle in which a series system and a parallel system are combined. Further, the present technology can also be applied to an electric vehicle (EV or BEV) and a fuel cell vehicle (FCV) that travel only by a drive motor without using an engine.

DESCRIPTION OF REFERENCE SYMBOLS

1: Lithium ion battery
11: Battery can
12, 13: Insulator
20: Electrode wound body
21: Positive electrode
22: Negative electrode
23: Separator
24: Center pin
25: Positive electrode lead
26: Negative electrode lead
31: Safety cover
32: Region joined by welding It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
    an electrode wound body having a structure in which a band-shaped positive electrode and a band-shaped negative electrode are stacked and wound with a separator interposed therebetween;
    an electrolyte solution;
    a battery can that accommodates the electrode wound body and the electrolyte solution;
    a battery lid that closes an open end portion of the battery can; and
    a safety valve mechanism provided between the battery lid and the electrode wound body,
    wherein the safety valve mechanism includes at least a safety cover,
    an outer peripheral portion of the battery lid and an outer peripheral portion of the safety cover are joined, and
    an area of a region where the outer peripheral portion of the battery lid and the outer peripheral portion of the safety cover are joined is 18.1% or more and 25.0% or less of a sectional area of the battery in a radial direction.

2. The secondary battery according to claim 1, wherein the outer peripheral portion of the safety cover has a protrusion on a face opposite to a face welded to the battery lid.

3. A method for manufacturing a secondary battery, the secondary battery comprising:
    providing an electrode wound body having a structure in which a band-shaped positive electrode and a band-shaped negative electrode are stacked and wound with a separator interposed therebetween;
    providing an electrolyte solution;
    providing a battery can that accommodates the electrode wound body and the electrolyte solution;
    providing a battery lid that closes an open end portion of the battery can; and
    providing a safety valve mechanism provided between the battery lid and the electrode wound body,
    wherein the safety valve mechanism includes at least a safety cover,
    an outer peripheral portion of the battery lid and an outer peripheral portion of the safety cover are joined by a welding method, and
    an area of a region where the outer peripheral portion of the battery lid and the outer peripheral portion of the safety cover are joined is 18.1% or more and 25.0% or less of a sectional area of the battery in a radial direction.

4. The method for manufacturing a secondary battery according to claim 3, wherein the welding method is an ultrasonic welding method.

5. An electronic device comprising the secondary battery according to claim 1.

6. An electric tool comprising the secondary battery according to claim 1.

7. An electronic device comprising the secondary battery according to claim 2.

8. An electric tool comprising the secondary battery according to claim 2.

* * * * *